(12) United States Patent
de Cherance

(10) Patent No.: US 7,793,466 B2
(45) Date of Patent: Sep. 14, 2010

(54) ARRANGEMENT OF A BUILDING MOBILE BETWEEN TWO POSITIONS, ONE SUPPORTED ON THE GROUND AND THE OTHER FLOATING

(76) Inventor: Frederic de Cherance, Maison la Desiree, Route de Bidache, Guiche (FR) F-64520

( * ) Notice: Subject to any disclaimer, the term of this patent is extended or adjusted under 35 U.S.C. 154(b) by 1735 days.

(21) Appl. No.: 10/492,423

(22) PCT Filed: Oct. 11, 2002

(86) PCT No.: PCT/FR02/03461

§ 371 (c)(1),
(2), (4) Date: Aug. 17, 2004

(87) PCT Pub. No.: WO03/031732

PCT Pub. Date: Apr. 17, 2003

(65) Prior Publication Data

US 2004/0261338 A1    Dec. 30, 2004

(30) Foreign Application Priority Data

Oct. 11, 2001    (FR) .................................. 01 13065

(51) Int. Cl.
*E04H 12/34*    (2006.01)
(52) U.S. Cl. ................ 52/64; 52/114; 52/111; 52/123.1; 52/143; 52/79.1; 52/79.2; 52/292
(58) Field of Classification Search .............. 52/292, 52/23, 169.11, 169.12, 174, DIG. 11, 64, 52/66, 123.1, 143, 65, 67, 79.1–79.2, 79.12, 52/298, 299, 169.13, 169.14, 117–118, 111, 52/114, 126.1, 126.6
See application file for complete search history.

(56) References Cited

U.S. PATENT DOCUMENTS

| 3,905,548 A | * | 9/1975 | Brodie ......................... 237/69 |
| 3,908,577 A | * | 9/1975 | Struyk ......................... 440/11 |
| 4,043,287 A |   | 8/1977 | Shorter |
| 4,355,834 A | * | 10/1982 | Alford ......................... 296/163 |
| 4,684,097 A | * | 8/1987 | Cox ......................... 248/354.3 |
| 4,689,926 A | * | 9/1987 | McDonald ............... 52/169.11 |
| 4,937,989 A | * | 7/1990 | Miyares et al. ............ 52/126.7 |
| 5,281,055 A |   | 1/1994 | Neitzke et al. |
| 5,347,949 A |   | 9/1994 | Winston |
| 5,803,007 A |   | 9/1998 | Stevens |

(Continued)

FOREIGN PATENT DOCUMENTS

GB    2374359 A    * 10/2002

(Continued)

*Primary Examiner*—Jeanette Chapman
(74) *Attorney, Agent, or Firm*—Young & Thompson

(57) ABSTRACT

An arrangement for a building (10), in particular a housing unit (18) mobile between two positions, one supported on the ground and the other floating, including a frame (12), floating elements (14) and guiding elements (16), designed to be installed in a flood-risk area. The guiding elements (16) include at least two masts (32) fixed in the ground and arranged in the median plane of the construction along an axis F substantially parallel to the flow direction of the water and collars (34), designed to slide along the masts (32).

14 Claims, 7 Drawing Sheets

Figure 1A:
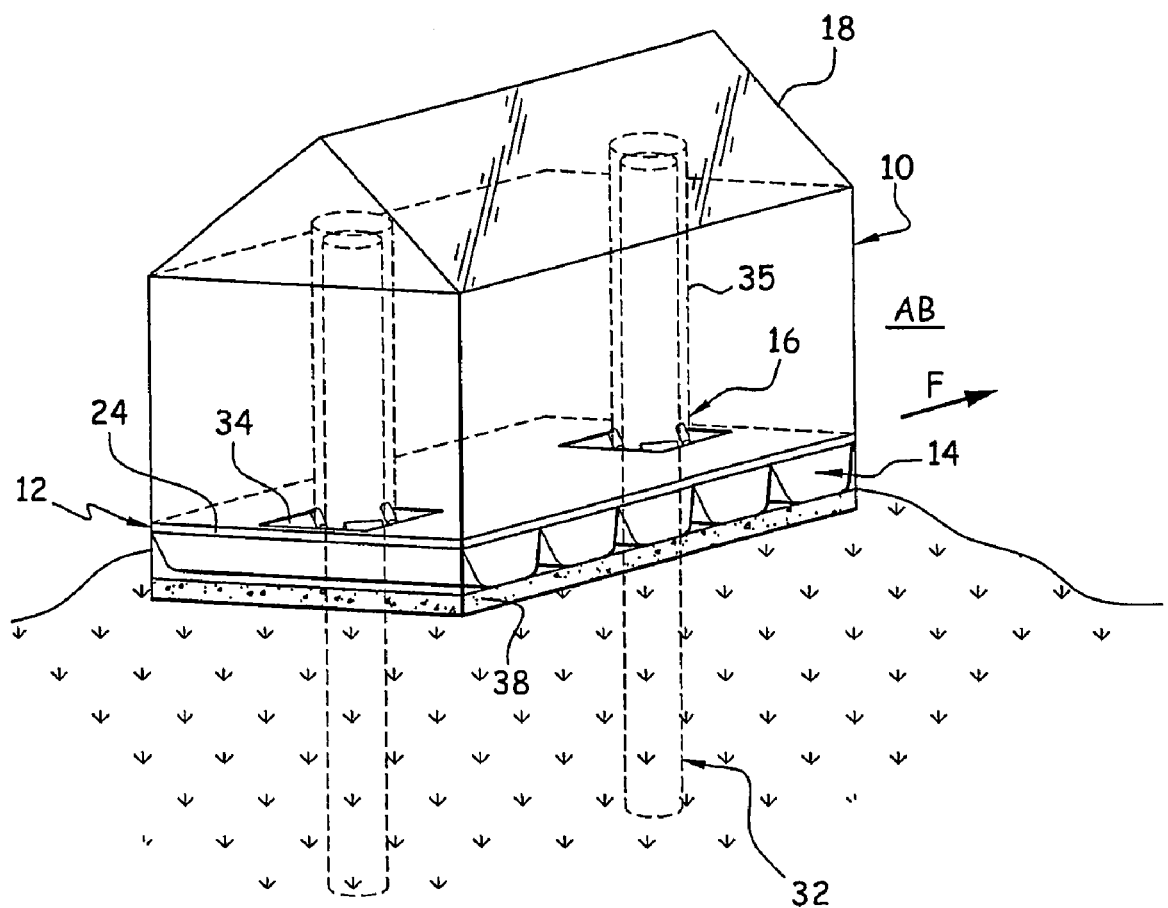

U.S. PATENT DOCUMENTS 6,042,301 A * 3/2000 Sovran .................. 405/112
6,311,434 B1 * 11/2001 Nelson .................. 52/143
6,347,487 B1 2/2002 Davis
6,474,027 B2 * 11/2002 Nelson .................. 52/143

FOREIGN PATENT DOCUMENTS

WO 98 38390 9/1998

* cited by examiner

ARRANGEMENT OF A BUILDING MOBILE BETWEEN TWO POSITIONS, ONE SUPPORTED ON THE GROUND AND THE OTHER FLOATING

The present invention relates to an arrangement of a construction movable between two positions one resting on the ground and the other floating.

It is known that there is a problem for constructions, whether vacation homes, warehouses or workshops, located in regions that are not floodable at the time of construction and which are later subject to floods. Thus, the region of the countryside can vary, the construction of roads, the provision of embankments or numerous other reasons, can modify the character of a region as to whether it is floodable or not.

Because of this, it is necessary to wait for a flood to determine the floodable characteristic of certain zones considered to be safe, with serious consequences entailed. Even in this case, the surrounding region continues to be developed and/or undergo construction because the administrative modifications are long to come into force. Moreover, it is necessary also to consider that certain floodable regions are particularly well located relative to a town for example and attractive even if the risk of flooding exists.

Often, the work to be undertaken to avoid any risk of flooding is too costly or cannot be carried out for other reasons.

The solution thus is to pay attention to the construction itself and to provide that it can undergo a flood without damage.

The solution is to provide an arrangement of construction which can float at the time of a flood.

Thus there is known from International patent application WO98/38390 an arrangement with a floating caisson which itself supports the construction.

In each of the corners there is provided a post permitting guiding the caisson assembly and construction provided with lap and catch means to hold this assembly in a stable horizontal position to the extent the water rises.

Such an arrangement is extremely complicated to use and moreover very high cost. Even more, it is difficult to imagine that the lap and catch means will operate at the time it is needed, with complete reliability.

Moreover, all the problems which arise from such constructions are not solved.

U.S. Pat. No. 5,347,949 also discloses a floating house mounted on jacks. This construction consists in combining a floor with floating caissons, the assembly being disposed on telescoping jacks located also at the four corners of the floor.

This solution with jacks is delicate because the telescoping systems must also be maintained, which is not simple and it is necessary also that when the time comes, none of the jacks will seize up so as to tilt the construction during rising of the float.

As to the floor, in the position on the ground, it rests on lugs connected to the ground, in addition to the caissons themselves which also rest on the ground and ensure stability of the construction when it is dry.

This gives rise to problems because these obstacles are a source of accumulation of impediments carried by the flood.

The structure being maintained by racks, the cleaning is no doubt possible after the flood but this mounting remains delicate in a hostile environment. Finally, it is necessary then to have a crane to lower the assembly suspended on the racks.

Such arrangements lead to solutions that are more theoretical than practical and ignore certain problems.

One of these problems arises when the flood is over and the water level falls. The construction must rest on stable elements as at the outset.

The solutions of the prior art for example prevent numerous obstacles to the flow of water and above all catch possible impediments carried by the flood such as blocks of stone, branches, tree trunks, beams or metallic debris.

Moreover, the spaces between the caissons themselves are adapted to catch floating debris carried by the flood beneath the caissons, debris which can give rise to problems during descent.

Another important problem is the guidance of construction during rising and falling movements. It is absolutely necessary that it operates under all circumstances and there cannot be a dysfunction which impedes the movements. During these mobile phases, the balance of the edifice must be preserved, which is not to say that it is necessary to preserve perfect horizontality.

At the same time, the resistance to the flood must be minimized.

Another problem is that of the connections with the electrical and water networks which are buried and extend throughout the construction.

Finally, it is necessary to take account of the cost of construction because the interest of building in a floodable region can be limited if the increased cost involved becomes very great.

The present invention overcomes the drawbacks of the known arrangements of the prior art and provides a reliable arrangement which does not spoil the appearance of the construction, particularly when it is a dwelling, because it is necessary also to take account of this consideration.

Figure 1B:
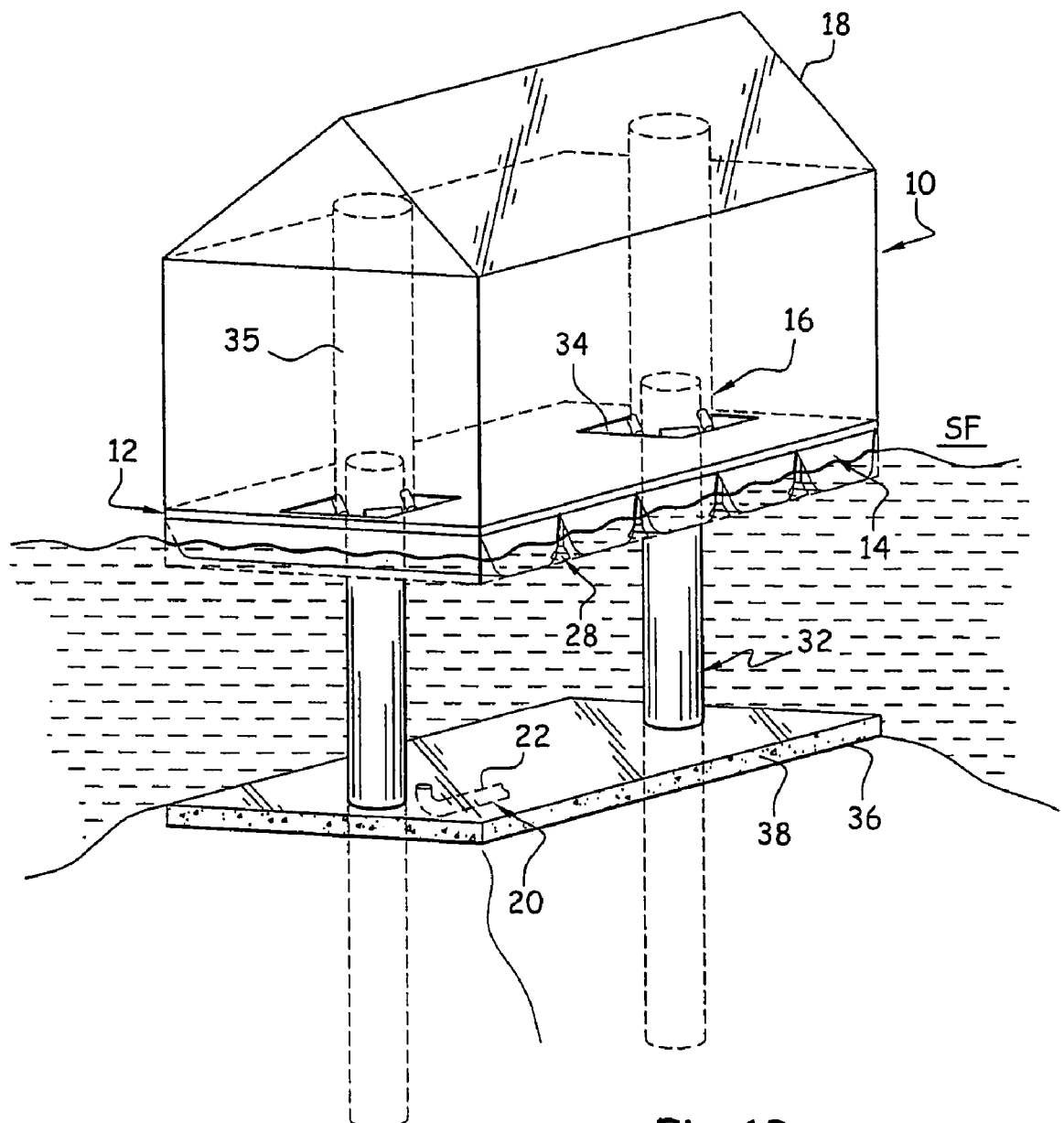
Figure 2:
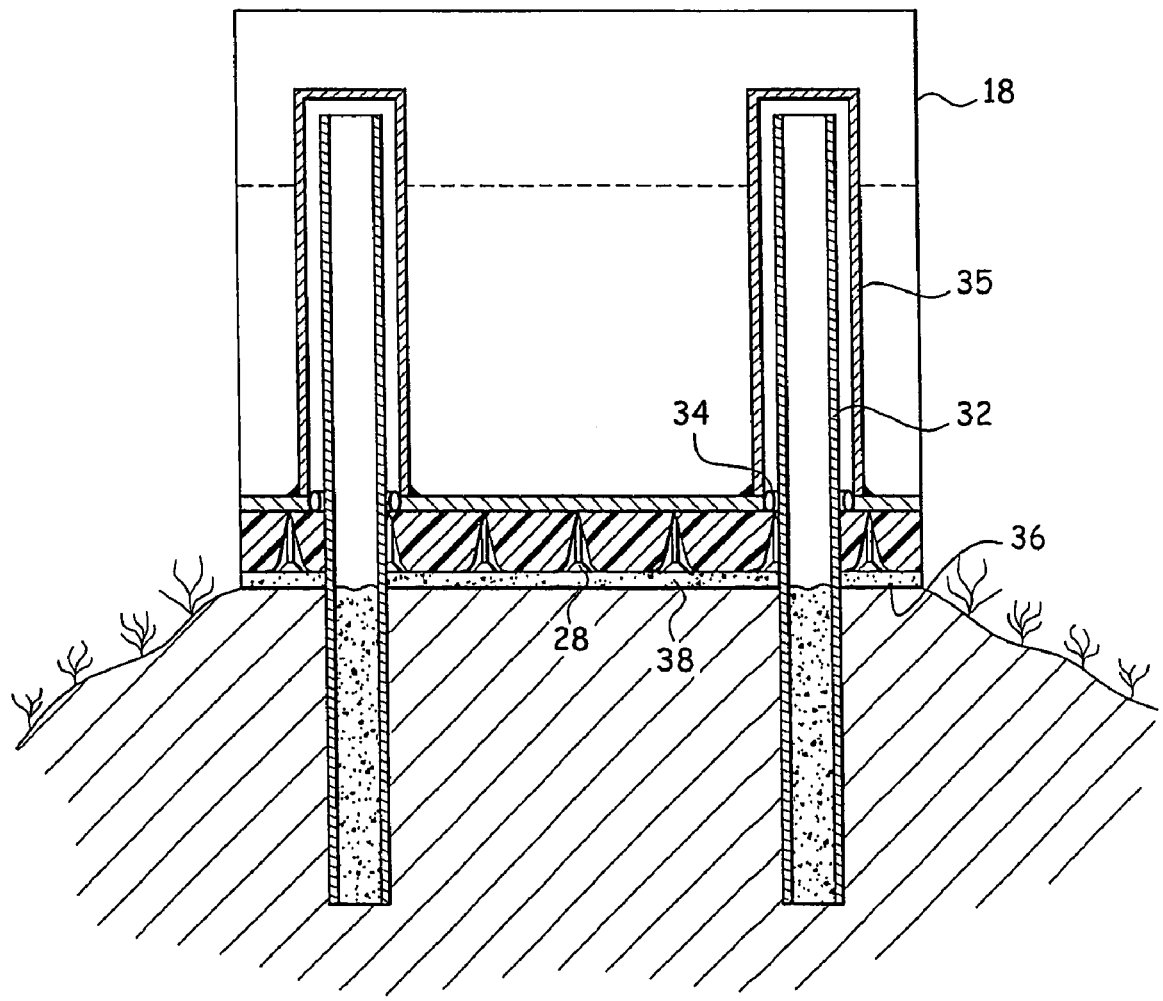
Figure 3:
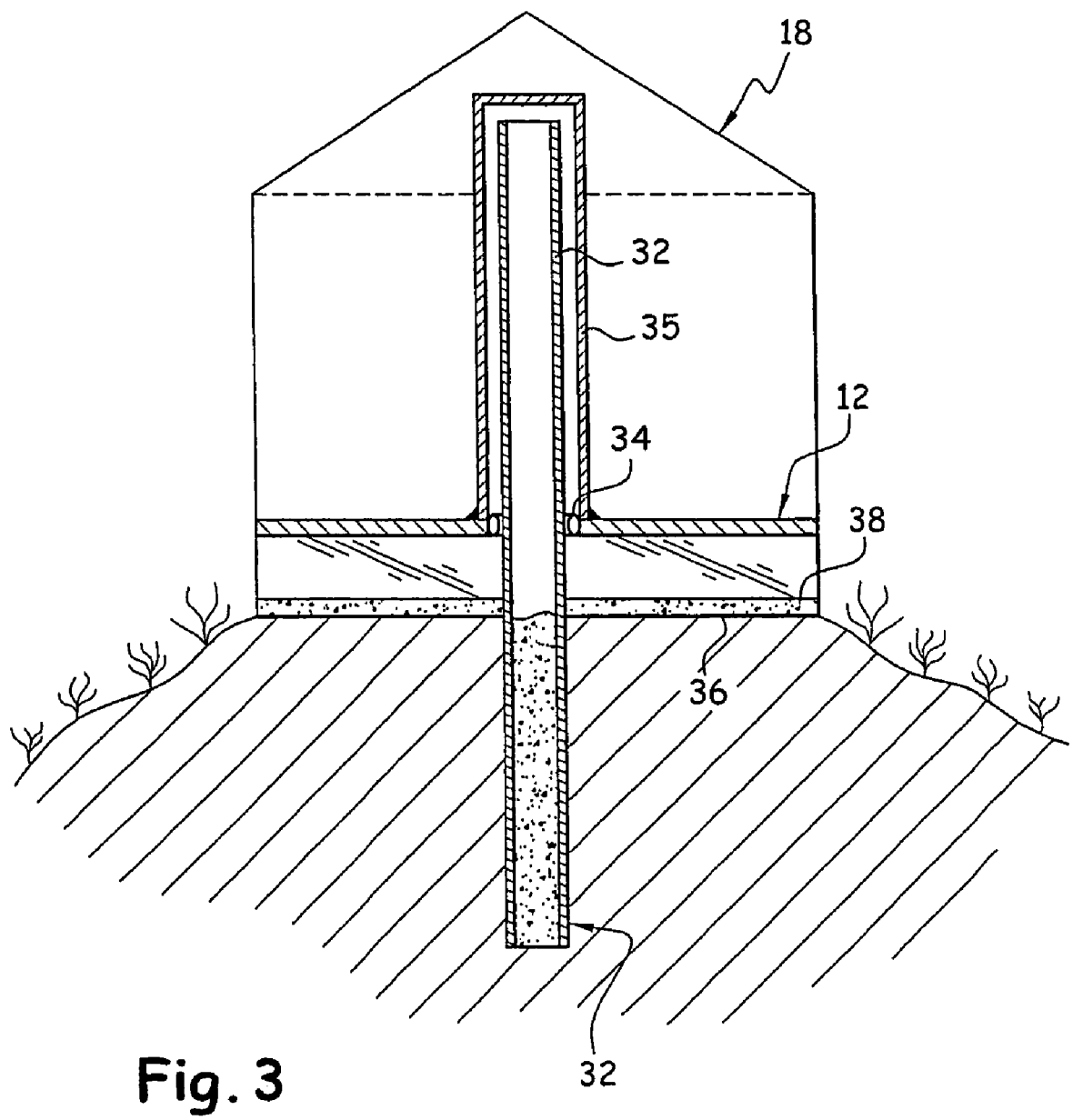
Figure 4:
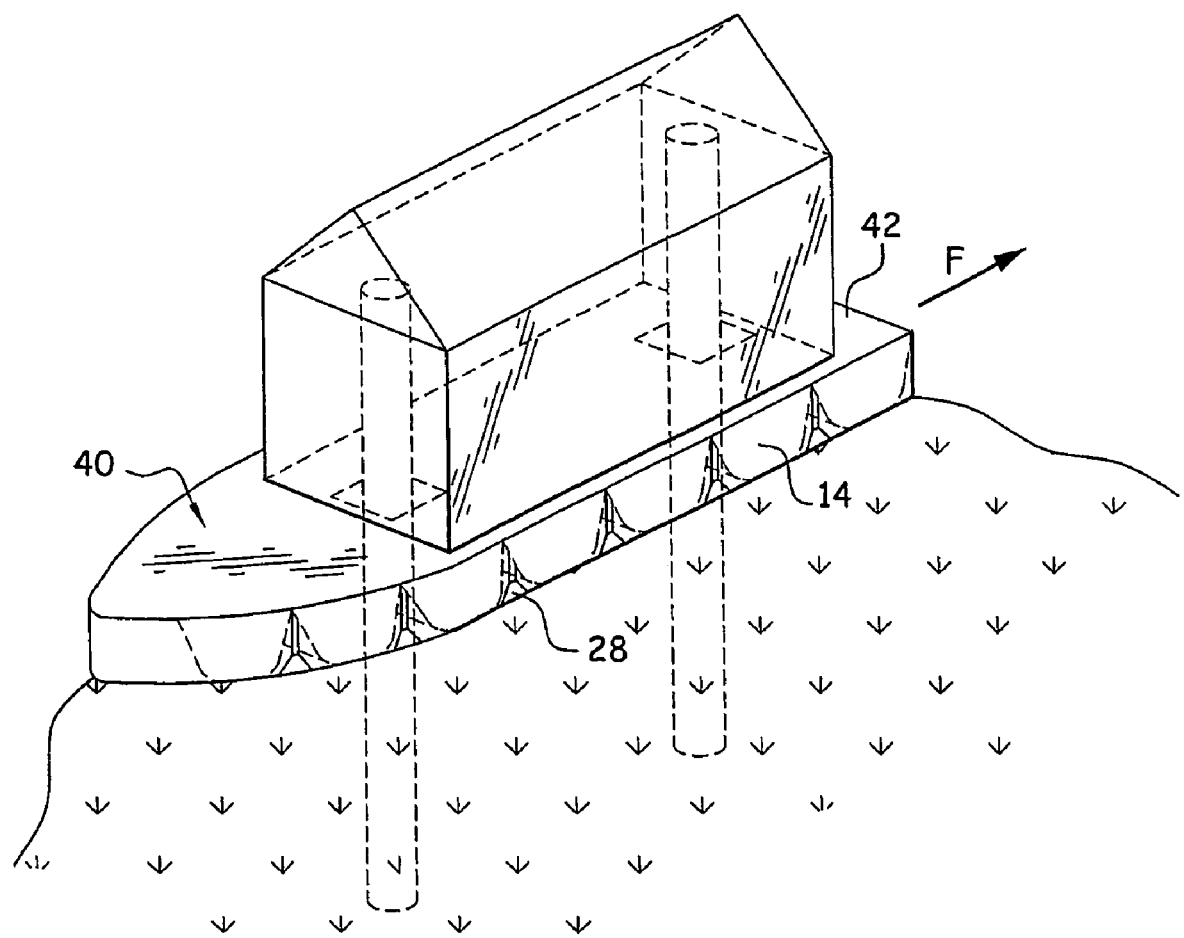
Figure 5:
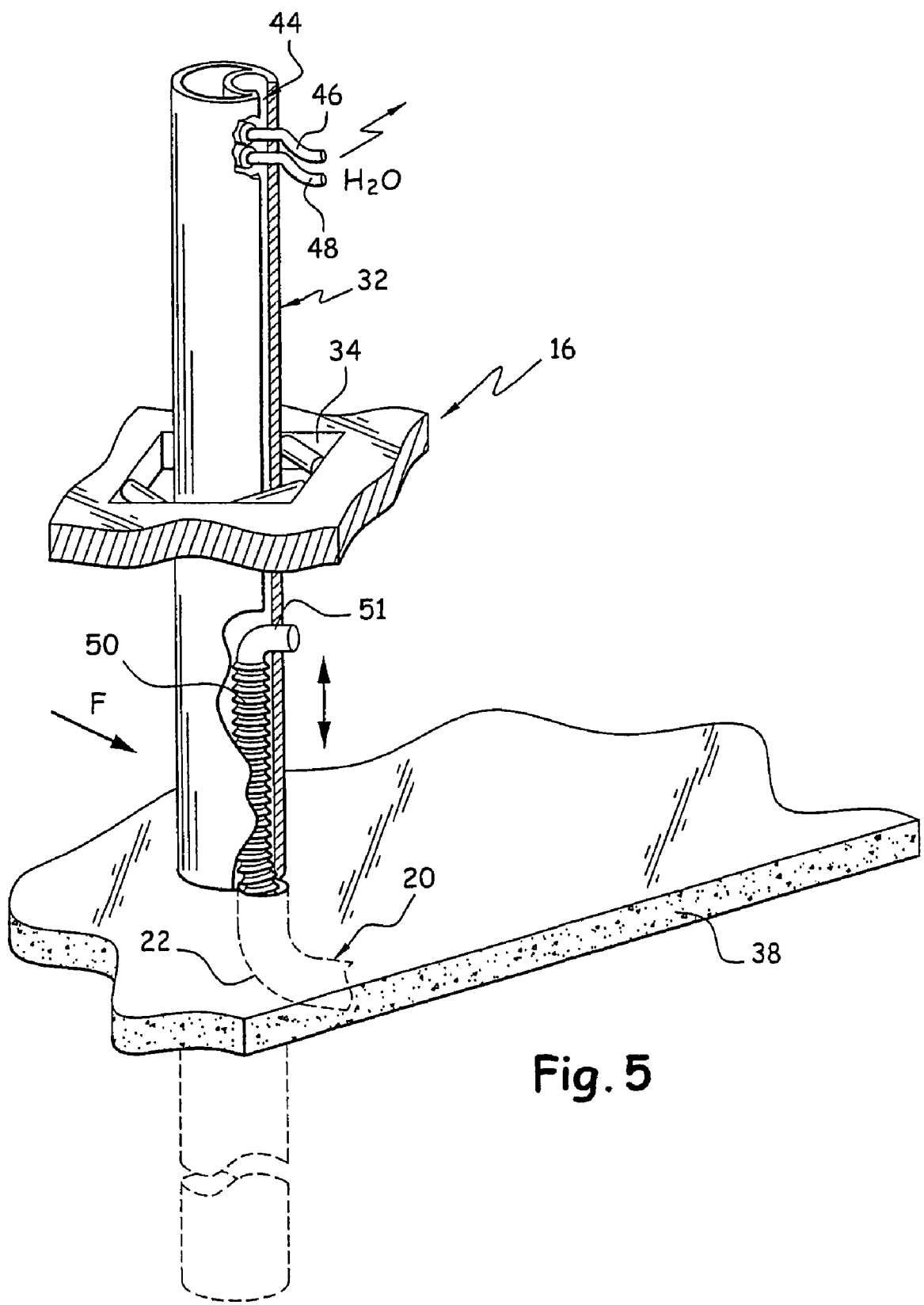
Figure 6:
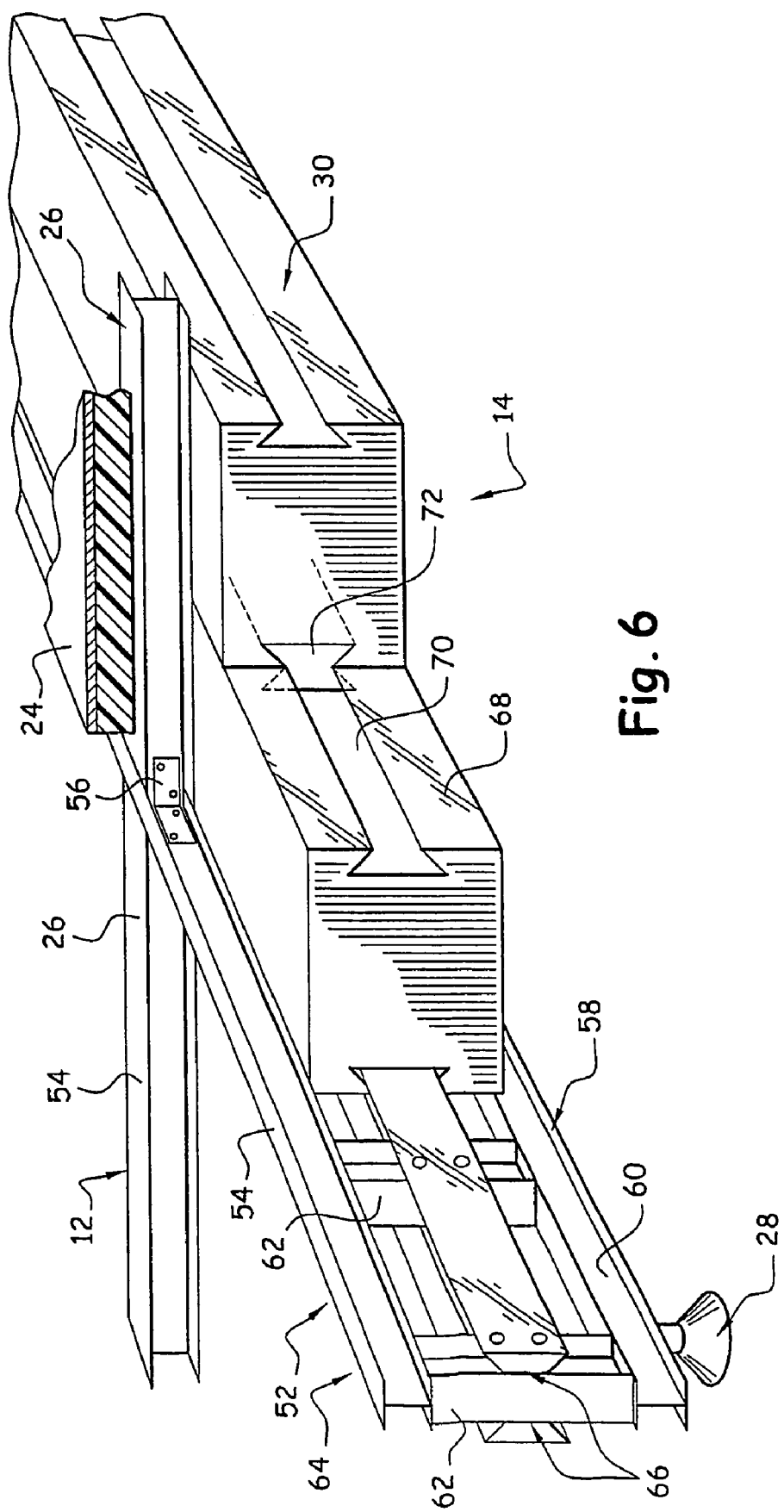

The present invention will now be described with respect to the accompanying drawings which show a preferred embodiment, which is non-limiting, the different figures of these drawings showing:

FIG. 1A a perspective schematic view of a construction provided according to the present invention, in the stable lower position, FIG. 1B a schematic perspective view of a construction arranged according to the present invention, in the floating position, FIG. 2 a longitudinal cross-sectional view of this same construction, FIG. 3, a view in transverse cross-section of this same construction, FIG. 4, a view of a modified embodiment with a hydrodynamic shape, FIG. 5, a detailed view of the electrical and fluid connections, and FIG. 6 a detailed view of a manner of mounting caissons.

In FIG. 1A, there is shown a construction 10 disposed on a frame 12 comprising floating means 12, guide means 16 of this construction between two positions, one lowered resting position AB and the other stable floating position SF in the case of a flood.

The direction of flow of the water is indicated by the arrow F.

The construction 10 is schematically shown by a dwelling house 18 but it could be for any other use. The proportions are exaggerated for clarity of the drawing and for technical understanding, to the detriment of appearance, which is not treated by the present invention.

Preferably, in the case of at least a dwelling, the construction is of wood, which limits the weight and permits slight deformation of the structure without undergoing damage.

In the case of a dwelling, there are necessarily provided networks 20 for electrical and fluid supply. For simplification of illustration, a single flexible member 22 is shown, adapted to contain the electrical supply cable, the potable water supply and the central conduit for evacuation of wastewater, at the least.

This construction is generally provided with an interior floor 24 that is insulated and waterproof.

As shown in FIG. 6, the frame 12 is preferably constituted by beams 26 of galvanized steel or aluminum for example, forming a network adapted to receive the insulated floor 24 of the construction. This network is necessary to ensure the distribution of the load and to keep this floor flat. This network serves also as the foundation of the construction.

This framework also comprises support feet 28, directed perpendicularly downwardly.

This frame 12 also includes floatation means 14 in the form of caissons 30, regularly distributed over all the surface. These caissons can if desired be of different sizes, as a function of the load supported but at the risk of complicating the production of the frame and giving rise to problems of adaptability.

As to the guide means 16 of this construction, between two positions, one lower and seated AB and the other stable and floating SF in the case of a flood, they comprise at least two masts 32 securely implanted in the ground. The technique of implantation of such piles are well known and currently in use.

Preferably, these masts are round or with a profiled cross-section particularly oval, in the direction of flow of the water, so as to limit the resistance to the water and to permit disengagement of debris carried by the flood.

These two masts are disposed in the median plane of the construction along an axis substantially parallel to the direction of flow of water as indicated by the arrow F. These two masts are of a height that is suitable as a function of the maximum level of the waters, to which should be added a margin of safety.

Generally, a height of one story is sufficient. On the other hand, it should be known what is the starting height, because it is also possible to provide an abutment below the construction.

These guide means are completed by collars 34 adapted to slide along the masts, for example frames with rollers disposed at 90°, in the corners of the frame. The play does not necessarily have a high precision because it is a matter of guiding and not sliding. No matter what the position of the frame, even if it inclines by several degrees, these collars always remain movable along the masts. A mounting with rollers or other complicated articulations and hence difficult to achieve reliability, costly and requiring upkeep, is not needed.

So as to hide the masts extending within the construction, there are provided pockets 35 secured to the floor, one pocket per mast. These pockets can be compartment elements of the construction as a function of the internal arrangements or elements completely in harmony with the construction.

As is shown in FIG. 1B, the ground surface 36 located below the construction is preferably covered with a concrete apron so as to provide a ground level without projections adapted to catch debris. It is for this reason that the support feet 38 are mounted secured to the frame and rise with the structure when this floats as shown in FIG. 1B.

This apron is anchored to the feet of the two masts. It is shown with a surface identical to that of the construction but it could extend outwardly without inconvenience. Similarly, the flat shape could desirably be of truncated pyramidal shape, which facilitates flow during a flood.

The accessories are not indicated in the drawings because they are not of primary importance but it is of course necessary to provide access means such as stairs to the periphery, either metallic and secured to the frame, or else removable. The same is true for the ramp of the possible garage which can be adapted as a function of the construction. The vehicle should be able to be supported by the chassis if it is in the garage at the time of the flood.

FIGS. 2 and 3 permit better understanding of the arrangement according to the invention. The references are identical for identical elements.

The equilibrium of the construction is dictated by the floating of the caissons and hence subject to a certain listing.

It will be noted that the construction is guided and held but that it rests freely when floating so as not to have high resistance to the flow.

A wood construction is accordingly of interest.

A preferred embodiment of the frame and of the flotation means attached to it is shown in FIG. 4.

This hydrodynamic form has a prow 40 and a stern 42 in the manner of a navigable structure so as to take account of the speed of flow relative to the structure, which is the reverse of navigable structures which move on a substantially motionless fluid surface.

These caissons are dimensioned so as to move the floor of the construction sufficiently above the surface of the flood to avoid water reaching the interior of the construction.

In FIG. 5, there is shown in detail the network 20 for electrical and fluid supply concentrated in a single flexible member 22 up to the foot of the mast.

In a simple embodiment, the mast is of circular cross-section and hollow within, with a C shaped recess 44 provided along a generatrix. The electrical cable 46 can pass through the wall of the foot of the mast and be coiled in the free internal space, like the flexible member 48 for supply of potable water.

The passage can be a sealed passage if necessary to avoid any penetration of water with an outlet through the upper portion of the mast, in this construction.

As to the conduit for wastewater, it can be disposed in the recess 44 and comprise a coil extensible conduit 50. Thus, during floating, this conduit 50 elongates under the exerted traction, the C shaped recess performing the function of a sheath. A commercial elbow 51 is secured to the end of this conduit and slides in the slot of the C shaped profile.

Preferably, the C shaped recess permits guiding the return of the coiled conduit 50 when the level falls and the chassis comes again to rest on the apron 38. The conduit is compressed and the sheath of the C shaped recess avoids any dislodging.

In FIG. 6, there is shown a manner of mounting the flotation means on a specific chassis.

The chassis in this case comprises a first layer 52 constituted by a network of beams 54 fixed together in known manner, for example by means of connecting members 56.

A second layer 58 comprises only a network of parallel beams 60 with crosspieces 62 which separate the two layers.

There are thus obtained parallel trusses 64.

Rails 66, with a dovetailed shape for example, are connected on opposite sides of each truss.

Caissons 68 carry grooves 70 of dovetail configuration on two opposite sides, adapted to coact by translation with the rails 66 parallel to the beams 60.

There can thus be provided in a secure but nevertheless removable fashion, caissons 68 on opposite sides of each truss.

As the caissons should not be too heavy, nor of too great unit volume, the width is less than that which separates two trusses.

Because of this, there are provided double dovetail connection pieces 72 which are interposed between two adjacent caissons to connect them to each other. There can thus be disposed several caissons between two trusses, without substantial discontinuity, to receive the debris of the flood.

The caissons can be made in any way, but a particularly satisfactory way consists of envelopes of polymeric material loaded with fibers to give sufficient mechanical characteristics, whose internal volume is filled with foam.

Such an arrangement permits the construction to take a first position bearing on the ground like a conventional construction connected to the ground and the other a floating position, in the same way as certain lakefront constructions so as to follow the progress of the flood and the height of the water when this takes place, whose duration is generally limited to several days.

The object is not necessarily to preserve the dwelling with its occupants during the flood.

Either the occupants have been warned in advance and they have moved to a non-flooded region, or the occupants are surprised and they can remain in the construction, sheltered from the weather and the danger, awaiting evacuation.

In a case of a small flood, the occupants can without problems remain in the construction.

Supplementally, autonomous means for producing energy can be onboard so as to provide needs because the networks are generally discontinued.

Similarly, the number of two masts is not limiting because, as a function of the dimensions of the construction, this number could be increased, on the condition of providing only a single alignment.

The invention claimed is:

1. An arrangement of a mobile construction, said arrangement comprising:
   a frame;
   a flotation means;
   a guide means, for implantation in a floodable region, the guide means comprise at least two masts implanted in the ground and disposed in a medial plane of the mobile construction along an axis substantially parallel to a direction of flow of water and collars adapted to slide along said at least two masts; and
   pockets secured to a floor of the mobile construction, a respective one of said pockets being disposed about a corresponding one of said masts at least in an inside of the mobile construction,
   wherein the arrangement of mobile construction is movable between two positions one resting on the ground and another floating.

2. The arrangement of a mobile construction according to claim 1, wherein, at least a surface which is located below the construction is covered with an apron free from obstacles.

3. The arrangement of a mobile construction according to claim 1, wherein the masts have a height adapted as a function of the maximum level of the waters with a margin of safety.

4. The arrangement of a mobile construction according to claim 1, wherein the masts are profiled.

5. An arrangement of a mobile construction, said arrangement comprising:
   a frame;
   flotation means; and
   guide means, for implantation in a floodable region, the guide means comprise at least two masts implanted in the ground and disposed in a medial plane of the mobile construction along an axis substantially parallel to a direction of flow of water and collars adapted to slide along said at least two masts;
   wherein the mobile construction is movable between two positions one resting on the ground and another floating, and
   wherein the frame comprises a first layer constituted of a network of beams fixed together, and a second layer with a network of parallel beams with crosspieces which separate the two layers to constitute trusses.

6. The arrangement of a mobile construction according to claim 5, wherein the frame comprises rails, connected on opposite sides of each truss and caissons provided with grooves adapted to coact by translation with the rails and to secure said caissons.

7. The arrangement of a mobile construction according to claim 6, wherein the arrangement comprises double connection pieces interposed between two adjacent caissons to connect them to each other.

8. The arrangement of a mobile construction according to claim 6, wherein the profile of the rails, of the grooves and of the connection pieces is dovetailed.

9. The arrangement of a mobile construction according to claim 1, wherein the arrangement comprises a network for supply of electricity and fluids and in that the masts comprise a C shaped recess provided along a generatrix, to receive at least a conduit for wastewater, coiled and extensible, with which is associated an elbow.

10. The arrangement of a mobile construction according to claim 1, wherein the frame and the flotation means have a hydrodynamic shape with a prow and a stern.

11. The arrangement of a mobile construction according to claim 7, wherein the profile of the rails, of the grooves and of the connection pieces is dovetailed.

12. An arrangement of a mobile construction, said arrangement comprising:
    a frame;
    a float connected to said frame;
    a guide means, for implantation in a floodable region, wherein the guide means comprise at least two masts implanted in the ground and extending into said mobile construction and disposed in a medial plane of the mobile construction along an axis substantially parallel to a longitudinal axis of said mobile construction and collars adapted to slide along said masts, and
    pockets secured to a floor of said frame, a respective one of said pockets being disposed about a corresponding one of said masts,
    wherein the mobile construction is movable along said masts between two positions one resting on the ground and another floating.

13. The arrangement of a mobile construction according to claim 1, wherein the arrangement is a dwelling house.

14. The arrangement of a mobile construction according to claim 1, wherein the guide means has only two masts.

* * * * *